United States Patent
Phay

(10) Patent No.: US 11,092,284 B2
(45) Date of Patent: Aug. 17, 2021

(54) SAFETY SYSTEM HAVING A SAFETY SWITCH

(71) Applicant: SICK AG, Waldkirch (DE)

(72) Inventor: Victor Kok Heng Phay, Admirax (SG)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 17/068,213

(22) Filed: Oct. 12, 2020

(65) Prior Publication Data

US 2021/0108760 A1     Apr. 15, 2021

(30) Foreign Application Priority Data

Oct. 14, 2019   (DE) .......................... 102019127614.4

(51) Int. Cl.
*F16P 3/08*     (2006.01)
*F16P 3/14*     (2006.01)

(52) U.S. Cl.
CPC .................. *F16P 3/08* (2013.01); *F16P 3/145* (2013.01); *F16P 3/147* (2013.01); *F16P 3/148* (2013.01)

(58) Field of Classification Search
CPC .... F16P 3/08; F16P 3/145; F16P 3/147; F16P 3/148
See application file for complete search history.

(56) References Cited

U.S. PATENT DOCUMENTS

2007/0013236 A1 *   1/2007  Fleiner ............... H03K 17/9525
                                                     307/326
2016/0260565 A1     9/2016  Link et al.

FOREIGN PATENT DOCUMENTS

| DE | 10252025 A1 | 5/2004 |
|---|---|---|
| DE | 102006046437 A1 | 4/2008 |
| DE | 102012111342 A1 | 5/2014 |
| DE | 112010000460 B4 | 12/2015 |

OTHER PUBLICATIONS

Office Action dated Aug. 6, 2020 issued in corresponding German Application No. 102019127614.4.

* cited by examiner

*Primary Examiner* — Carlos Amaya
(74) *Attorney, Agent, or Firm* — Nath, Goldberg and Meyer; Jerald L. Meyer

(57) ABSTRACT

A safety system having a safety switch for monitoring a safe protective equipment status of movable protective equipment, having a base housing that comprises at least two part members that can be positioned with respect to one another, wherein a signal receiver is provided in one part member and a signal transmitter is provided in the other part member so that a safe state of the protective equipment is detectable by means of a control and evaluation unit, and having an interlocking device having an electromagnet and a retaining plate that is disposed opposite the electromagnet for locking or unlocking the protective equipment, wherein the control and evaluation unit is configured to unlock or lock the interlocking unit after checking and verifying the signal receiver, wherein a coil of the electromagnet forms a resonant circuit with the capacitor, with the control and evaluation unit being configured to control the resonant circuit cyclically by at least one pulse signal, and with the control and evaluation unit being configured to evaluate the pulse response from the resonant circuit and with at least one contact or with no contact between the electromagnet and the retaining plate being detectable by the control and evaluation unit in dependence on the pulse response.

8 Claims, 6 Drawing Sheets

VS

SAFETY SYSTEM HAVING A SAFETY SWITCH

Figure 1:
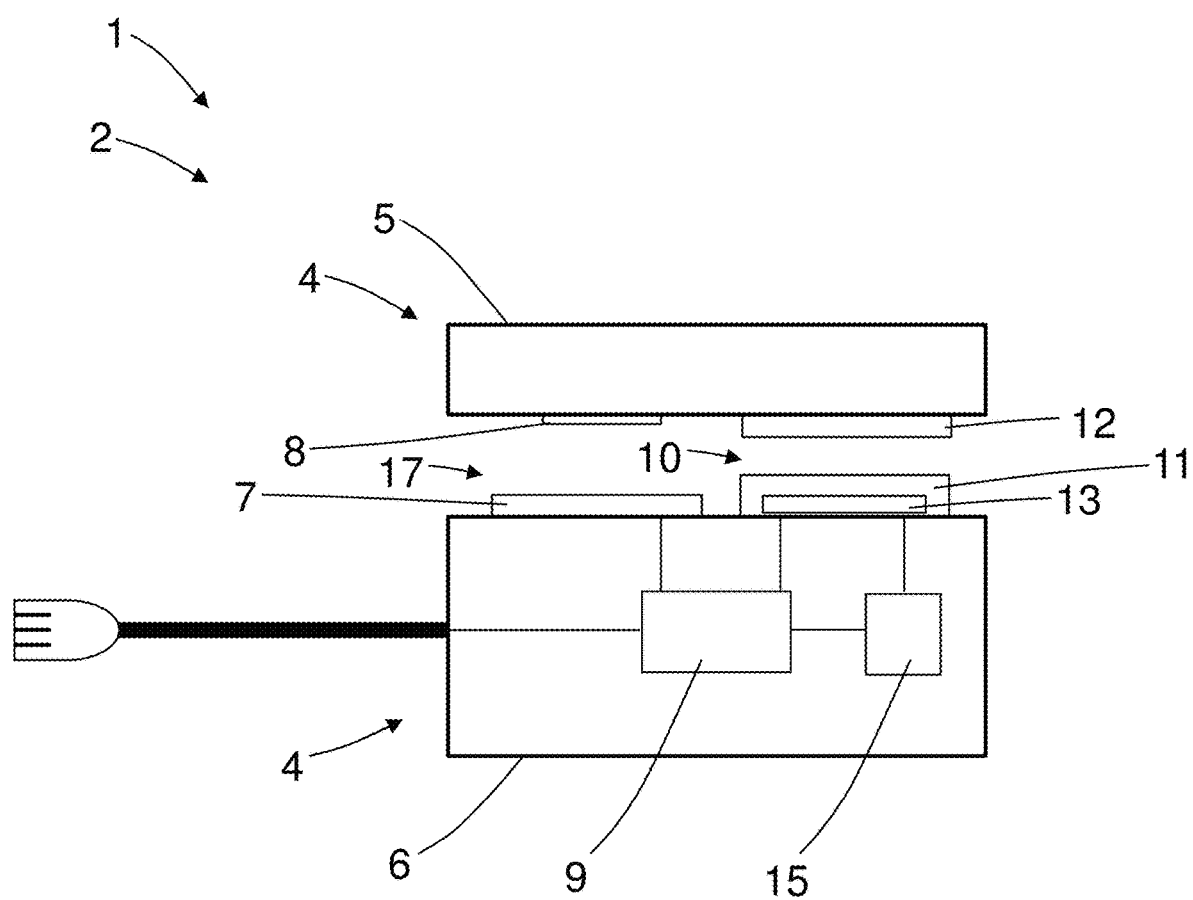

The present invention relates to a safety system having a safety switch for monitoring a safe protective equipment status of movable protective equipment, having a base housing that comprises at least two part members that can be positioned with respect to one another, wherein a signal receiver is provided in one part member and a signal transmitter is provided in the other part member so that a safe state of the protective equipment is detectable by means of a control and evaluation unit, and having an interlocking device having an electromagnet and a retaining plate that is disposed opposite the electromagnet for locking or unlocking the protective equipment, and wherein the control and evaluation unit is configured to unlock or lock the interlocking unit after checking and verifying the signal receiver. Safety switch is a synonymous designation customary on the market for an interlocking device or interlocking unit having a lock in accordance with the EN ISO 14119 standard.

Machines are used in industry that can be dangerous to humans. Examples of such machines are presses or robots that perform movements that are dangerous to humans. These zones are secured, for example, by mechanical fences or light grids. Protective equipment, for example doors, that are provided with safety switches, is provided in order nevertheless to be able to move into the zone of the hazardous machine. If the door is opened, the safety switch provides for a shutting down of the machine.

Such safety switches furthermore have a lock so that the door is blocked and cannot be opened at all. The lock can only be deactivated to gain entry to the hazardous zone by a stop command at the door or at the central human machine interface (HMI) of the machine, with the hazardous movement being shut down. With machines or processes with trailing movements, the door has to be locked for so long until the danger in the machine is no longer present.

The doors at machines serves as protective equipment, namely as movable protective equipment in the sense of the machine guideline.

The monitoring and locking of the door is implemented by safety switches having a lock that are available on the market. A type 2 and a type 4 are, for example, known in accordance with the ISO 14119 standard. These switches are based, on the one hand, on a mechanical principle, e.g. the safety switch i10Lock of SICK corporation, or, for example, on RFID technology on the safety switch having a lock TR10 Lock or MLP1 of the SICK corporation.

An object of the invention comprises providing an improved safety system having an improved safety switch, with it being ensured that the safety switch is closed or open.

The object is satisfied in accordance with claim 1 by a safety system having a safety switch for monitoring a safe protective equipment status of movable protective equipment, having a base housing that comprises at least two part members that can be positioned with respect to one another, with a signal receiver being provided in one part member and a signal transmitter being provided in the other part member so that a safe status of the protective equipment can be detected by means of a control and evaluation unit and that comprises an interlocking unit having an electromagnet and a retaining plate that is disposed opposite the electromagnet for locking or unlocking the protective equipment, with the control and evaluation unit being configured to unlock or lock the interlocking unit after checking and verifying the signal receiver, characterized in that a coil of the electromagnet forms a resonant circuit with a capacitor, with the resonant circuit being acted on cyclically by the control and evaluation unit by at least one pulse signal and with the pulse response being evaluated by the control and evaluation unit and with at least one contact or with no contact between the electromagnet and the retaining plate being detectable in dependence on the pulse response.

In accordance with the invention, the coil is acted on by a negative pulse signal in the activated state in which the coil is operated and is provided with voltage. The coil is, for example, supplied with a voltage of 24 V. The supply voltage of the coil is, for example, cyclically switched off or interrupted for this purpose for a brief time period, for example 5 ms. The switching off or interruption of the voltage supply takes place cyclically, for example at intervals of 500 ms, so that the operation of the electromagnet is not impaired by the coil. The pulse signal can also be called a test pulse or test gap.

The cyclic interruption or switching off of the supply voltage takes place electronically, for example using an electronic switch. The electronic switch can, for example, be a transistor, a transistor stage, or similar. The cyclic interruption is controlled by the control and evaluation unit, for example via an output stage or the transistor.

The pulse response or stop response or pulse function or stop function of the resonant circuit is evaluated by the control and evaluation unit. The resonant circuit here preferably has a low attenuation so that the stop response displays a transient oscillation behavior in dependence on the retaining plate close to or in contact with the electromagnet. The curve shape of the transient oscillation behavior changes in dependence on the closeness or on a contact of the retaining plate with the electromagnet since the coil of the electromagnet is electromagnetically influenced by the metallic retaining plate.

The capacitor in the resonant circuit will, for example, be discharged faster during the pulse duration without a retaining plate so that the stop response forms a charge curve of the capacitor having a short time constant.

If the retaining plate is a few millimeters remote from the electromagnet, the capacitor in the resonant circuit is discharged less fast during the pulse duration, for example, so that the stop response is a charge curve having a longer time constant.

If the retaining plate is in contact or in electrical contact with the electromagnet, the capacitor in the resonant circuit is discharged most slowly during the pulse duration, for example, so that the stop response is a charge curve having an even longer time constant.

In accordance with the invention, for example, the flank steepness of the stop response or a comparison of the stop response can be compared with a comparison value or with a threshold value.

The evaluation of the stop response takes place, for example, by a simple transistor circuit or a transistor stage that is evaluated by the control and evaluation unit.

In a further development of the invention, the resonant circuit is a parallel resonant circuit. The coil of the electromagnet is in parallel with the capacitor here. The parallel resonant circuit has the property that the resistance observable at the terminals moves to infinity on resonance.

The parallel resonant circuit has the advantage that the coil or the electromagnet can be statically operated and the capacitor has so-to-say no effect in the static operating mode since it is charged and thus forms an almost infinitely high resistance.

In a further development of the invention, an attenuation factor $\xi$ of the resonant circuit amounts to at most 0.3 and in particular at most 0.2. A resonant circuit is thus used that has a high overshoot behavior. Steep flanks of the pulse response that are simple to evaluate are thus produced during the short switching off pulses or voltage pulses.

The pulse width depends on the electromagnet, in particular on the inductance of the coil and the capacitance of the capacitor. In a further development of the invention, the pulse width amounts to a maximum of 6 ms, in particular to a maximum of 5 ms, with the pulses having an interval of at least 400 ms, in particular of at least 500 ms. The pulse width thus does not result in a function limitation of the electromagnet in the active state with an applied voltage. The pulse width or pulse length is furthermore sufficiently long to be able to carry out a simple evaluation. The control and evaluation unit can thus be configured simply and inexpensively.

In a further development of the invention, an NPN transistor or an NPN transistor stage is arranged for the evaluation of the pulse response. The NPN transistor is arranged in an emitter circuit, for example. The voltage of the electromagnet is here supplied to the NPN transistor as an input signal via a voltage divider. The collector connection is connected via a resistor to a reference potential of, for example, 3.3 or 5 volts. The emitter connector is connected to ground. The collector is connected to the control and evaluation unit as a signal output In this respect, a reducing voltage of the pulse response at the base connector results in a blocking of the transistor and thus in a positive digitized voltage signal at the output of the transistor, namely at the collector-emitter path of the transistor.

The positive response signal of the transistor is the longer, the slower the capacitor is charged and the longer the time constant is.

A simple digital output signal at the outlet of the transistor or of the transistor stage can thus be evaluated by the control and evaluation unit.

The detection of the signal transmitter by the signal receiver and the detection of the retaining plate by means of the pulse evaluation form two diverse signal sources, whereby a diverse and redundant signal evaluation is provided that satisfies a high safety level. The safety switch can thus satisfy a safety integrity level of up to SIL3 in accordance with EC61508/IEC61511.

In a further development of the invention, the signal transmitter and the signal receiver are configured as an RFID system having an RFID transponder and an RFID reader. In this respect, the RFID transponder is arranged at the first part member at which the retaining plate is arranged. The first part member thus forms a passive component without its own voltage supply.

The RFID reader is arranged at the second part member at which the electromagnet is also arranged. The second part member forms an active component having a connector for signal lines and a voltage supply. It can be determined by the RFID reader whether the RFID transponder is in the vicinity of the RFID reader. It can thereby be determined whether the first part member is in the vicinity of the second part member.

Figure 2:
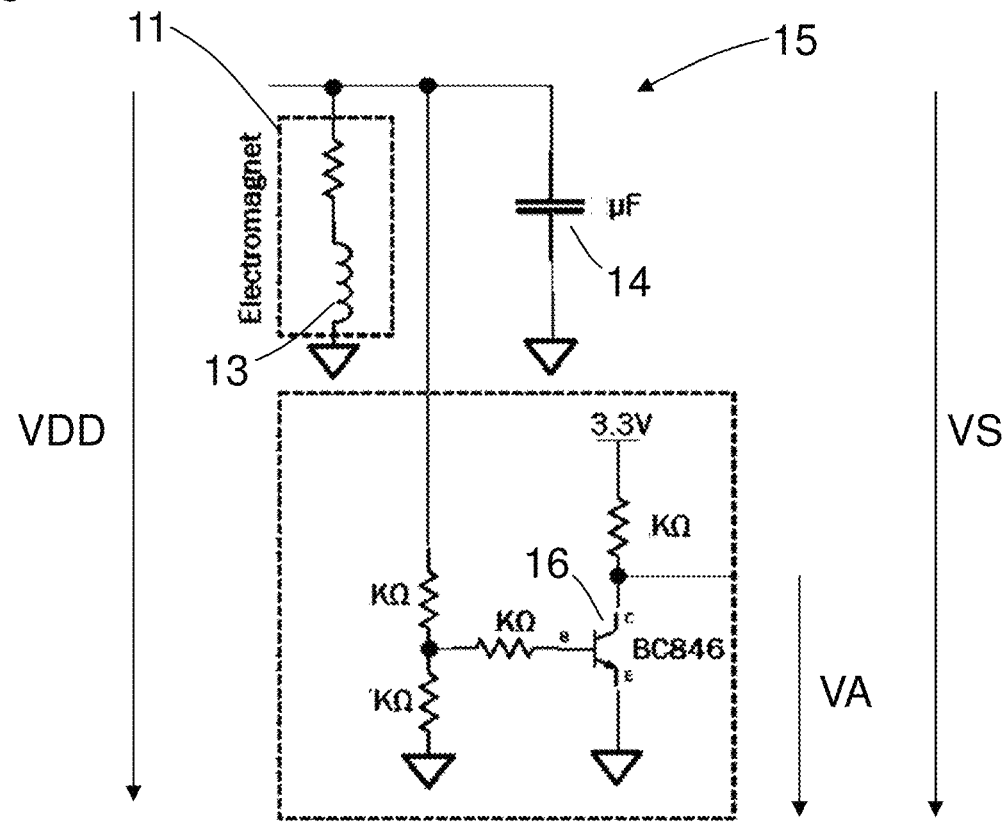
Figure 3:
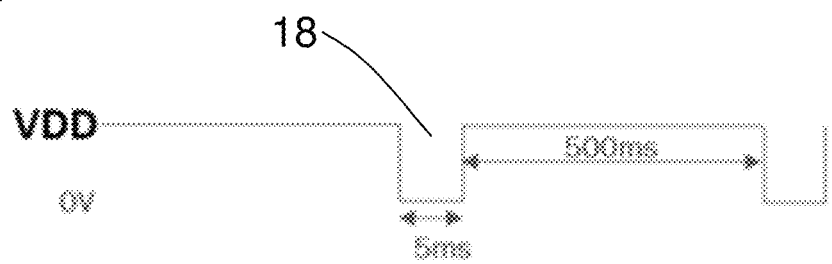
Figure 4:
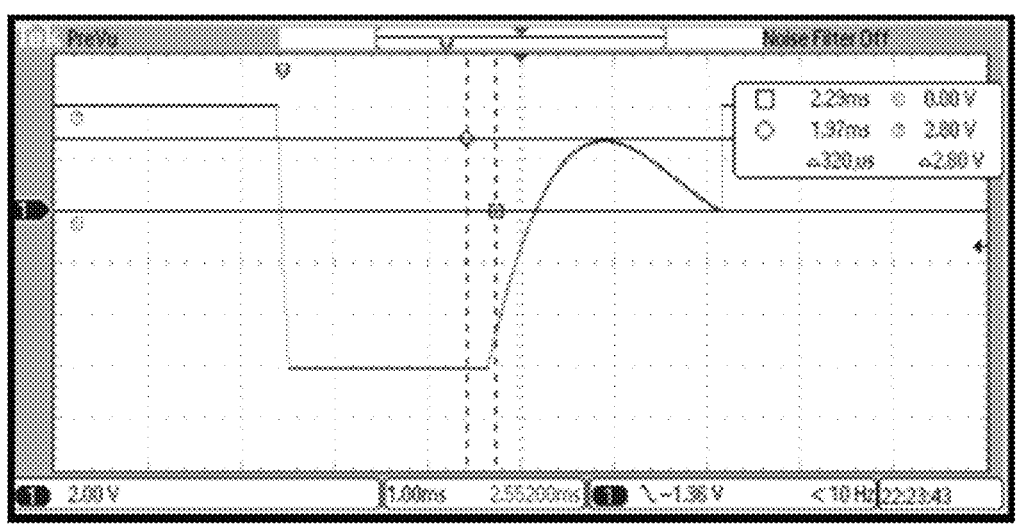
Figure 5:
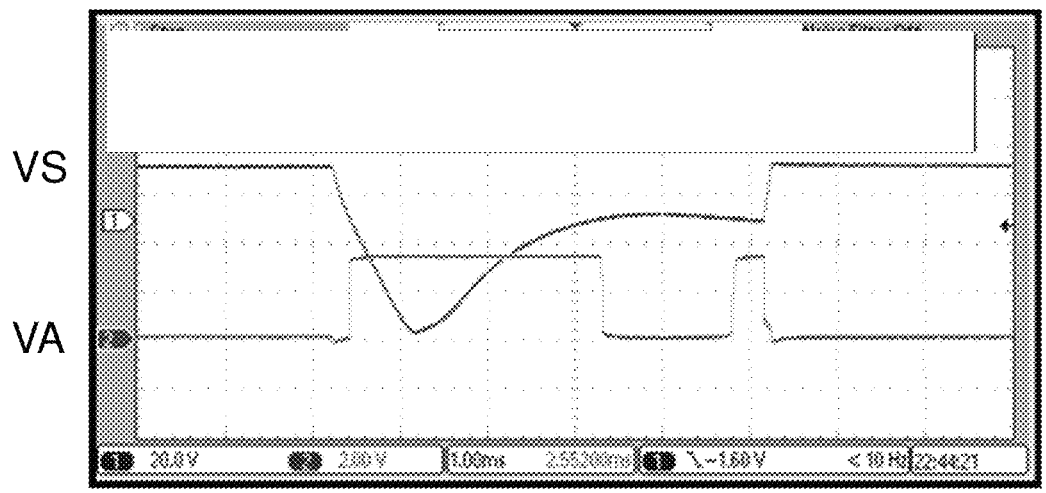
Figure 7:
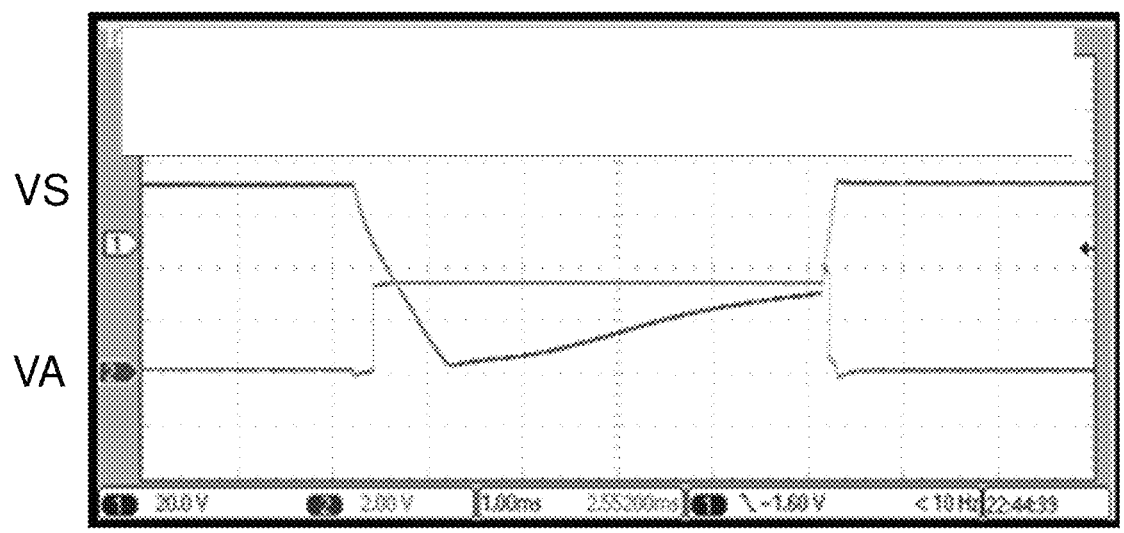

The invention will also be explained in the following with respect to further advantages and features with reference to the enclosed drawing and to embodiments. The Figures of the drawing show in:

FIG. 1 a safety system in accordance with the invention having a safety switch;

FIG. 2 an evaluation circuit;

FIG. 3 a supply voltage with voltage interruptions;

FIG. 4 a stop response or pulse function;

FIG. 5 respectively, a stop response and an output signal; and to FIG. 7

Figure 8:
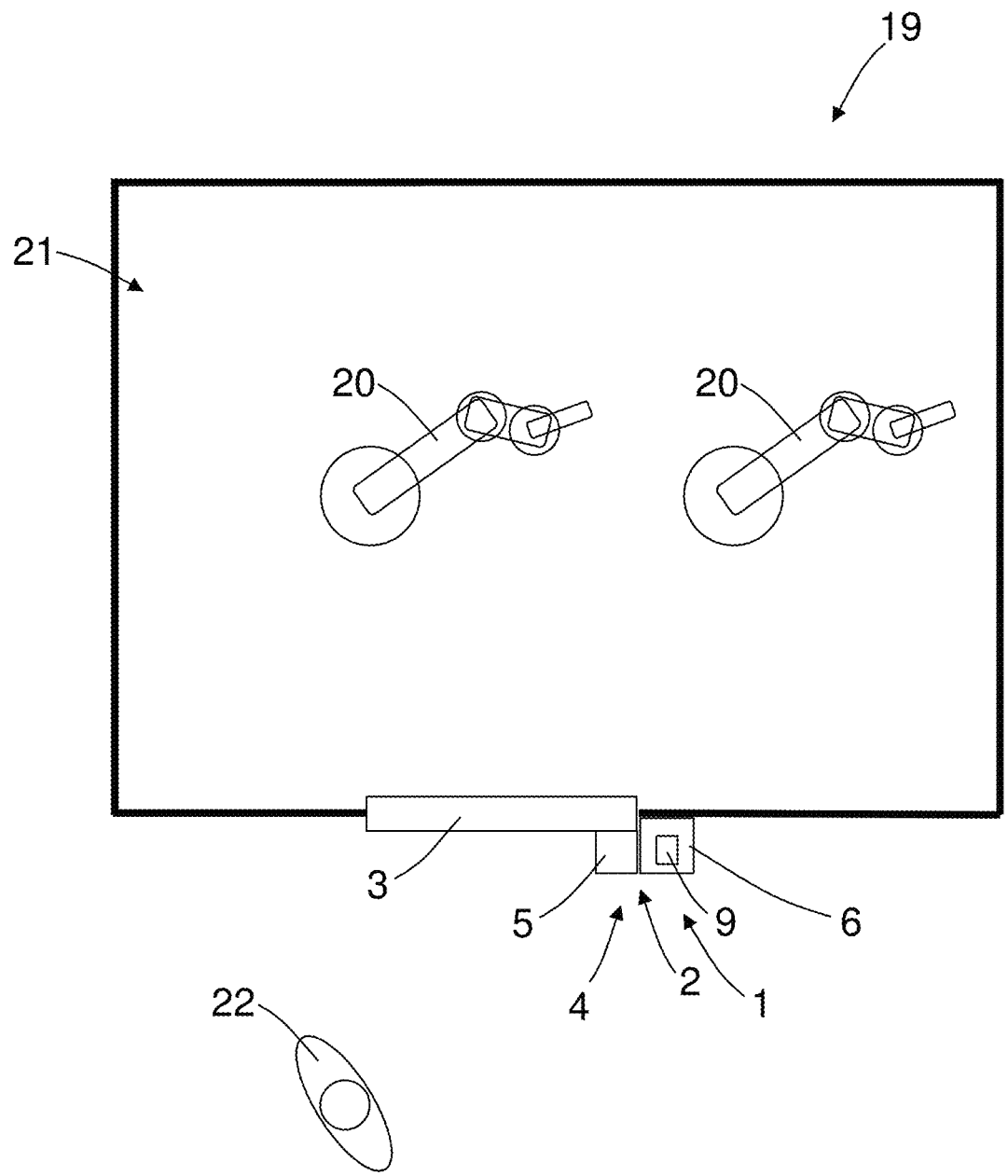

FIG. 8 a unit having a safety system.

In the following Figures, identical parts are provided with identical reference numerals.

FIG. 8 shows a unit 19 having a robot 20 and a hazardous zone 21. In accordance with FIG. 8, a safety system 1 is arranged having a safety switch 2 for monitoring a safe protective equipment status of movable protective equipment 3 having a base housing 4 that comprises at least two part members 5 and 6 that can be positioned with respect to one another.

The unit 19 can, for example in accordance with FIG. 8, be an industrial unit for manufacturing products. The unit 19 can also be a part of a machine or a unit 19 having a plurality of machines. The unit 19 has a hazardous zone 21 or a safety zone that may not be entered by persons 22 when the unit is 19 active since the person 22 may be in danger from parts of the unit 19. One or more robots 20 whose dangerous active zone is disposed within the hazardous zone 21 are, for example, arranged in the unit 19.

The movable protective equipment 3 can be a door or a gate or similar for securing a hazardous zone.

FIG. 1 shows a safety system 1 having a safety switch 2 for monitoring a safe protective equipment status of movable protective equipment, having a base housing 4 that comprises at least two part members 5 that can be positioned with respect to one another, with a signal receiver 7 being provided in one second part member 6 and a signal transmitter 8 being provided in the other first part member 5 so that a safe status of the protective equipment can be detected by means of a control and evaluation unit 9, and that comprises an interlocking unit 10 having an electromagnet 11 and a retaining plate 12 that is disposed opposite the electromagnet 11 for locking or unlocking the protective equipment, with the control and evaluation unit 9 being configured to unlock or lock the interlocking unit 10 after checking and verifying the signal receiver 7, characterized in that a coil 13 of the electromagnet 11 forms a resonant circuit 15 with a capacitor, with the resonant circuit 15 being acted on cyclically by the control and evaluation unit 9 by at least one pulse signal and with the pulse response being evaluated by the control and evaluation unit 9 and with at least one contact or with no contact between the electromagnet 11 and the retaining plate 12 being detectable in dependence on the pulse response.

In accordance with FIG. 1, the coil 13 is acted on by a negative pulse signal in the activated state in which the coil 13 is operated and is provided with voltage. The coil 13 is, for example, supplied with a voltage of 24 V. The supply voltage of the coil 13 is, for example, cyclically switched off or interrupted for this purpose for a brief time period, for example 5 ms. The switching off or interruption of the voltage supply takes place cyclically, for example at intervals of 500 ms, so that the operation of the electromagnet 11 is not impaired by the coil 13. The pulse signal can also be called a test pulse or test gap.

The cyclic interruption or switching off of the supply voltage VDD, that is shown in FIG. 3, takes place electronically, for example using an electronic switch. The electronic switch can, for example, be a transistor, a transistor stage, or similar. The cyclic interruption is controlled by the control and evaluation unit 9, in accordance with FIG. 1, for example, via an output stage or the transistor.

The resonant circuit 15 from FIG. 1 is shown in more detail in FIG. 2. FIG. 2 shows the supply voltage VDD, the stop response VS, and the output signal VA.

The pulse response or stop response VS or pulse function or stop function of the resonant circuit, that is shown in FIG. 4, is evaluated by the control and evaluation unit 9. The resonant circuit 15 here preferably has a low attenuation so that the stop response VS displays a transient oscillation behavior that can be evaluated in dependence on the retaining plate 12 close to or in contact with the electromagnet 11. The curve shape of the transient oscillation behavior changes in dependence on the closeness or on a contact of the retaining plate 12 with the electromagnet 11 since the coil 13 of the electromagnet 11 is electromagnetically influenced by the metallic retaining plate 12.

FIG. 5 shows the stop response VS and a digitized output signal VA for the event that no retaining plate is in the vicinity of the electromagnet. The digitized output signal VA is formed on the basis of a threshold comparison with the stop response VS and is evaluated by the control and evaluation unit 9. As soon as the signal of the stop response VS has fallen below a specific level, the output signal VA has a positive level. The output signal VA thus has a first longer pulse and a second shorter pulse in accordance with FIG. 5.

The capacitor 14 in the oscillating circuit 15 will, for example, be discharged faster in accordance with FIG. 2 during the pulse duration without a retaining plate 12 so that the stop response VS forms a charge curve of the capacitor 14 having a short time constant in accordance with FIG. 5.

The control and evaluation unit 9, that is, for example, configured as a microcontroller, triggers the 5 ms long pulse at intervals of 500 ms and monitors the output signal VA or the output voltage. The control and evaluation unit 9 or the microcontroller checks the output signal VA, for example by polling, by software, or by an interrupt routine by software or hardware.

Figure 6:
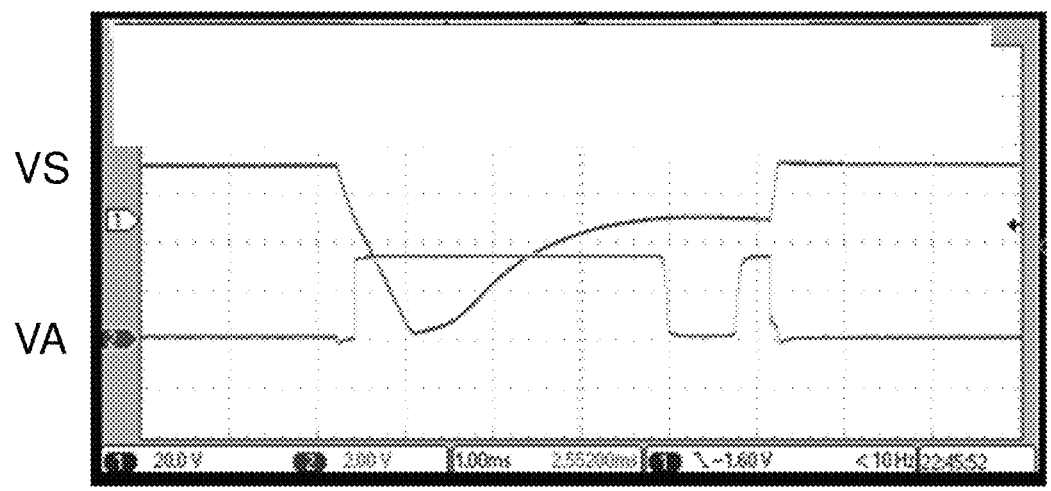

FIG. 6 shows the stop response VS and a digitized output signal VA for the event that no retaining plate 12 is in the vicinity of the electromagnet 11. The digitized output signal VA is formed on the basis of a threshold comparison with the stop response VS and is evaluated by the control and evaluation unit 9. As soon as the signal of the stop response VS has fallen below a specific level, the output signal VA has a positive level. The first longer pulse of the output signal VA is extended in accordance with FIG. 6 with respect to the output signal VA in accordance with FIG. 5.

If the retaining plate 12 is a few millimeters remote from the electromagnet 11, the capacitor 14 in the oscillating circuit 15 is discharged less fast in accordance with FIG. 2, while the pulse duration, for example, is discharged less fast so that the stop response VS is a charge curve having a longer time constant, in accordance with FIG. 6.

If the retaining plate 12 is in contact or in electrical contact with the electromagnet 11, the capacitor 14 in the resonant circuit 15 is discharged most slowly during the pulse duration, for example, so that the stop response VS is a charge curve having an even longer time constant, in accordance with FIG. 7.

FIG. 7 shows the stop response VS and a digitized output signal VA for the event that no retaining plate 12 is in contact with the electromagnet 11. The digitized output signal VA is likewise formed on the basis of a threshold comparison with the stop response VS and is evaluated by the control and evaluation unit 9 in accordance with FIG. 1. As soon as the signal of the stop response VS has fallen below a specific level, the output signal VA has a positive level. The first longer pulse of the output signal VA is extended in accordance with FIG. 7 with respect to FIG. 6 and is now only a single longer signal.

If the control and evaluation unit 9 detects the contact between the electromagnet 11 and the retaining plate 12, a pulse signal 18 is no longer generated by the control and evaluation unit 9, for example, and a continuous supply voltage VDD of, for example, 24 volts is applied to the electromagnet 11 without interruptions.

If the safety switch 2 is opened in accordance with FIG. 1, which is detectable, for example, by the signal receiver 7, the control and evaluation unit 9 can again cyclically apply the pulse signal 18 to the electromagnet 11 to again detect a contact with the retaining plate 12.

In accordance with FIGS. 5 to 7, for example, the flank steepness of the stop response VS or a comparison of the stop response VS can be compared with a comparison value or with a threshold value.

The evaluation of the stop response VS takes place, for example, by a simple transistor circuit accordance with FIG. 2 or a transistor stage that is evaluated by the control and evaluation unit 9.

In accordance with FIG. 2, the resonant circuit 15 is a parallel resonant circuit. The coil 13 of the electromagnet 11 is in parallel with the capacitor 14 here.

The parallel resonant circuit has the advantage that the coil 13 or the electromagnet 11 can be statically operated and the capacitor 14 has so-to-say no effect in the static operating mode since it is charged and thus forms an almost infinitely high resistance.

In accordance with FIG. 2, an attenuation factor $\xi$ of the resonant circuit 15 amounts, for example, to at most 0.3 and in particular to at most 0.2. A resonant circuit 15 having a high quality is thus formed. Steep flanks of the pulse response that are simple to evaluate are thus produced during the short switching off pulses or voltage pulses in accordance with FIGS. 5 to 7.

In accordance with FIG. 3, the pulse width amounts to a maximum of 6 ms, in particular to a maximum of 5 ms, with the pulses having an interval of at least 400 ms, in particular of at least 500 ms. The pulse width thus does not result in a function limitation of the electromagnet 11 in the active state with an applied voltage. The pulse width or pulse length is furthermore sufficient to be able to carry out a simple evaluation.

In accordance with FIG. 2, an NPN transistor 16 is, for example, arranged for the evaluation of the pulse response. The NPN transistor 16 is arranged in an emitter circuit. The voltage of the electromagnet 11 is here supplied to the NPN transistor as an input signal via a voltage divider. The collector connection is connected via a resistor to a reference potential of, for example, 3.3 V. The emitter connector is connected to ground. The collector is, in accordance with FIG. 1, connected to the control and evaluation unit 9 as a signal output In this respect, a reducing voltage of the pulse response VS at the base connector results in a blocking of the transistor 16 and thus in a positive digitized voltage signal or output signal VA at the output of the transistor 16, namely at the collector-emitter path of the transistor 16.

The positive output signal VA of the transistor 16 is the longer, the slower the capacitor 14 is charged and the longer the time constant is in accordance with FIGS. 5 to 7.

A simple digital output VA signal at the outlet of the transistor 16 or of the transistor stage can thus be evaluated by the control and evaluation unit 9.

In accordance with FIG. 1, the signal transmitter 8 and the signal receiver 7 are configured, for example as an RFID system having an RFID transponder and an RFID reader. In this respect, the RFID transponder is arranged at the first part member 5 at which the retaining plate is arranged. The first part member 5 thus forms a passive component without its own voltage supply.

The RFID reader is arranged at the second part member 6 at which the electromagnet 11 is also arranged. The second part member 6 forms an active component having a connector for signal lines and a voltage supply. It can be determined by the RFID reader whether the RFID transponder is in the vicinity of the RFID reader. It can thereby be determined whether the first part member 5 is in the vicinity of the second part member 6.

REFERENCE NUMERALS 1 safety system
2 safety switch
3 protective equipment
4 base housing
5 first part member
6 second part member
7 signal receiver
8 signal transmitter
9 control and evaluation unit
10 interlocking unit
11 electromagnet
12 holding plate
13 coil
14 capacitor
15 resonant circuit
16 transistor
17 RFID system
18 pulse signal
19 unit
20 robot
21 hazardous zone
22 person
VDD supply voltage
VS stop response
VA output signal

The invention claimed is:

1. A safety system having a safety switch for monitoring a safe protective equipment status of movable protective equipment, the safety system comprising:

a base housing that comprises at least first and second part members that can be positioned with respect to one another, wherein a signal receiver is provided in the first part member and a signal transmitter is provided in the second part member so that a safe state of the protective equipment is detectable by means of a control and evaluation unit, and an interlocking device having an electromagnet and a retaining plate that is disposed opposite the electromagnet for locking or unlocking the protective equipment, wherein the control and evaluation unit is configured to unlock or lock the interlocking unit after checking and verifying the signal receiver, wherein a coil of the electromagnet forms a resonant circuit with a capacitor, with the control and evaluation unit being configured to control the resonant circuit cyclically by at least one pulse signal, and with the control and evaluation unit being configured to evaluate the pulse response from the resonant circuit and with at least one contact or with no contact between the electromagnet and the retaining plate being detectable by the control and evaluation unit in dependence on the pulse response.

2. The safety system in accordance with claim 1, wherein the resonant circuit is a parallel resonant circuit.

3. The safety system in accordance with claim 1, wherein a damping factor $\xi$ amounts to at most 0.3.

4. The safety system in accordance with claim 3, wherein the damping factor $\xi$ amounts to at most 0.2.

5. The safety system in accordance with claim 1, wherein a pulse width of the pulse signal amounts to a maximum of 6 ms.

6. The safety system in accordance with claim 5, wherein the pulse width of the pulse signal amounts to a maximum of 5 ms.

7. The safety system in accordance with claim 1, wherein an NPN transistor or an NPN transistor stage is arranged for the evaluation of the pulse response.

8. The safety system in accordance with claim 1, wherein the signal transmitter and the signal receiver are configured as an RFID system having an RFID transponder and an RFID reader.

* * * * *